United States Patent [19]

Botimer

[11] Patent Number: 4,619,566
[45] Date of Patent: Oct. 28, 1986

[54] TOOL SUPPORT ASSEMBLY

[76] Inventor: Donald W. Botimer, 8718 Swaffer Rd., P.O. Box 175, Frankenmuth, Mich. 48734

[21] Appl. No.: 587,807

[22] Filed: Mar. 9, 1984

[51] Int. Cl.$^4$ ............................................. B23B 39/08
[52] U.S. Cl. .................... 409/232; 279/1 B; 279/1 TS; 279/81; 408/239 R; 409/234
[58] Field of Search ............. 279/1 B, 91, 8, 1 A, 279/89, 90, 9, 79, 81, 1 Q, 155, 1 TS, 9 R, 9 A, 24, 28, 29, 46 R, 76, 79, 80, 93; 409/232, 234; 408/239 R, 239 A, 238

[56] References Cited

U.S. PATENT DOCUMENTS

| | | | |
|---|---|---|---|
| 2,370,487 | 2/1945 | Poutie | 279/79 X |
| 2,641,478 | 6/1953 | Sigg | 279/9 X |
| 2,766,029 | 10/1956 | Bruestle | 279/79 X |
| 2,805,594 | 9/1957 | Fogel | 279/79 X |
| 2,851,295 | 9/1958 | Chaffee | 279/1 Q |
| 3,115,348 | 12/1963 | Penland | 279/1 TS |
| 3,179,965 | 4/1965 | Khachigian | 408/238 X |
| 3,512,793 | 5/1970 | Botimer | 279/91 |
| 3,521,896 | 7/1970 | Matsumoto | 279/91 |
| 3,658,351 | 4/1972 | Benjamin et al. | 279/1 B |
| 3,747,946 | 7/1973 | Edens | 279/81 |
| 3,851,890 | 12/1974 | Smith | 279/1 B X |

FOREIGN PATENT DOCUMENTS

| | | | |
|---|---|---|---|
| 1526546 | 9/1978 | United Kingdom | 408/239 R |
| 0921696 | 4/1982 | U.S.S.R. | 279/1 B |

Primary Examiner—Gil Weidenfeld
Assistant Examiner—Glenn L. Webb
Attorney, Agent, or Firm—Learman & McCulloch

[57] ABSTRACT

A tool support assembly comprising a rotary spindle which carries a tubular body having a socket therein for the removable accommodation of a coupling member to which any one of a number of tools may be fitted. The coupling member is adapted to be fitted to the tubular body during rotation of the spindle and thereafter to be driven by the spindle. Yieldable, shock absorbing, replaceable plates are carried by the coupling member and the rotary body to cushion the initial engagement therebetween. The coupling member and the socket have axially elongated, complementally tapered and cylindrical surfaces to provide substantial lateral stability for a tool supported by the coupling member.

32 Claims, 8 Drawing Figures

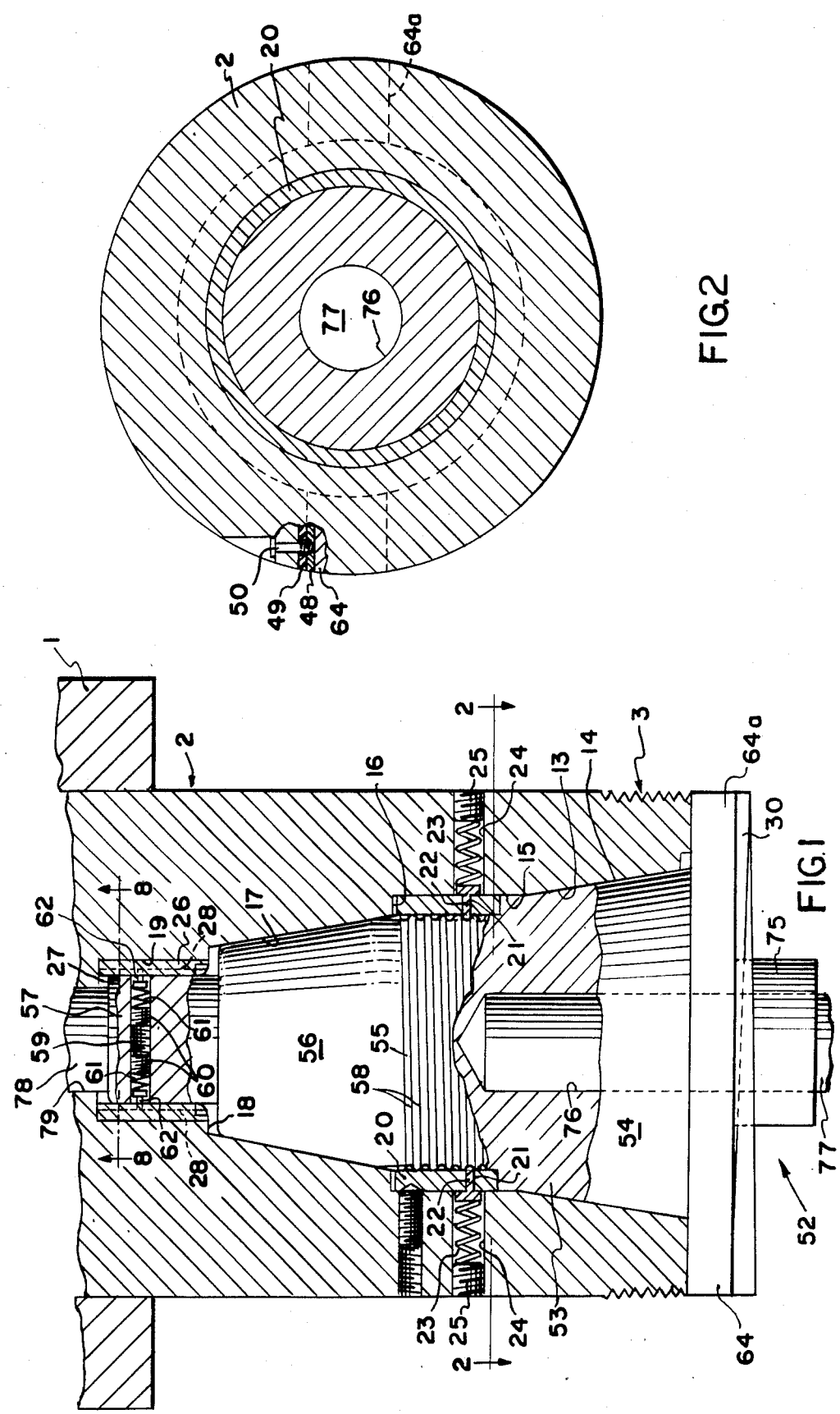

TOOL SUPPORT ASSEMBLY

This invention relates to tool holder apparatus of the kind that is adapted to be fitted to and removed from a rotary spindle of machine tool and without necessarily requiring stopping of the rotation of the spindle.

BACKGROUND OF THE INVENTION

Tool holders of the general class to which the invention relates are disclosed in Nickless Pat. No. 2,719,722; Botimer Pat. No. 3,512,793; and Koch Pat. No. 3,829,109. Another tool holder construction of the general class to which the invention relates is disclosed in Botimer copending application Ser. No. 461,141, filed Jan. 26, 1983. Such application also discloses a clutch mechanism which may be utilized by the present construction during the coupling and uncoupling of a tool to and from a rotating spindle without requiring the machine tool operator to touch either the spindle, the tool, or the tool holder.

Although the devices disclosed in the aforementioned patents and application enable a tool to be coupled to and uncoupled from a rotating spindle, the tools heretofore used in such operations have been fairly light in size. That is, tools such as drills and taps, for example, are sufficiently light weight that the manual coupling and uncoupling during spindle rotation is not precluded. However, heavier tools, such as end mills, shell mills, boring bars, and the like must be of such strength and rigidity as to be able to compensate for side thrusts. Such tools, therefore, have substantial weight and, consequently, greater inertia which sometimes makes it difficult, if not impossible, to enable tool and spindle coupling and uncoupling to be performed manually.

In those instances in which the coupling and uncoupling of tools to and from a rotary spindle occurs without stopping the spindle, it is inevitable that wear or deformation, or both, occurs between those parts of the spindle and tool which initially engage one another during the fitting of the tool to the spindle. The greater the weight of the tool and the greater the speed of rotation of the spindle, the greater the wear and deformation of such parts. The clutch mechanism disclosed in the above identified application enables relatively heavy tools to be fitted to a spindle which rotates faster than one adapted for use in the manual operation. The faster rotation of a spindle during tool change operations, however, may result in accelerated wear or deformation, or both, of those parts of the tool support and spindle assembly which first engage one another.

A primary object of the present invention, therefore, is to provide a tool support assembly adapted to be coupled and uncoupled to and from a continuously rotating spindle assembly and wherein wear and deformation of the respective parts are minimized. Another object of the invention is to provide for the replacement of such parts following their wear or deformation and without necessitating replacement of other components of the spindle or tool support assemblies.

A further object of the invention is to provide a tool support assembly which can be coupled to and uncoupled from a rotating spindle, and which enables substantial side thrust loads to be accommodated.

SUMMARY OF THE INVENTION

Apparatus constructed in accordance with the invention is adapted for use in conjunction with a rotary spindle journaled in a stationary housing and which accommodates a rotary body having a socket capable of removably receiving a tool support. The socket and the tool support are so configured as to promote coaxial alignment of the rotary body and the tool support and to provide extremely good lateral stability therebetween. Means is provided that enable the body and the tool support to be coupled and uncoupled to and from one another during rotation of the spindle and the body. Those parts of the body and the tool support which initially engage one another during coupling of the tool support to the body are resiliently yieldable so as to absorb some of the shock associated with the engagement between relatively rotating members. Such parts preferably are separable so as to be replaceable without necessitating replacement of the entire body or the entire tool support.

The driving connection between the tool support and the spindle-carried body is effected by driving surfaces which are engageable with one another, but only after relative rotation between the body and the tool carrier has fully or substantially terminated. As a consequence, the driving surfaces are protected against damage.

DESCRIPTION OF THE DRAWINGS

A preferred embodiment of the invention is disclosed in the following description and in the accompanying drawings, wherein:

FIG. 1 is a fragmentary, vertical sectional view of apparatus constructed in accordance with the invention and illustrating a coupling member and tool support fitted to a tubular body supported by a rotary spindle;

FIG. 2 is a transverse sectional view taken on the line 2—2 of FIG. 1 with parts broken away to illustrate some of the details of the construction;

THE PREFERRED EMBODIMENT

Figure 3:
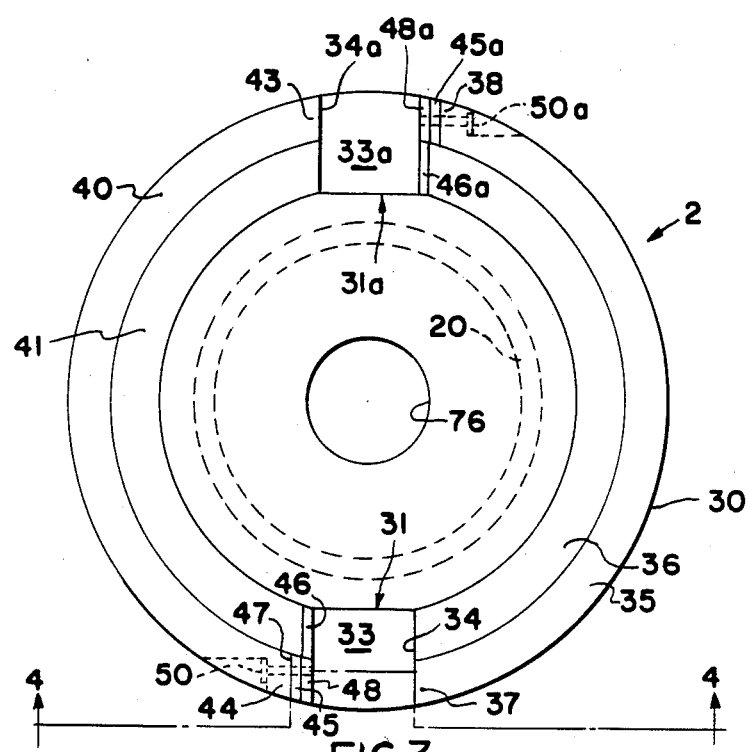
FIG. 3 is a bottom plan view of the tubular body removed from the spindle.

Apparatus constructed in accordance with a preferred embodiment of the invention is adapted for use in connection with a rotary machine tool having a spindle 1 journaled for rotation about an axis. The spindle is fixed in any suitable manner to a body 2 that may be threaded adjacent its free end, as is shown at 3, for the accommodation of a correspondingly threaded retainer of the kind illustrated in the aforementioned application, but which is not shown in the drawings for purposes of clarity.

The body 2 has an axially extending bore 13 composed of a plurality of axially spaced sections. Adjacent the free end of the body is an inwardly tapered section 14 that communicates at its inner end with a cylindrical section 15. At the inner end of the cylindrical section 15 is an annular shoulder 16 from which extends an inwardly tapering section 17 terminating at its inner end in a shoulder 18 from which extends a cylindrical recess 19. As is indicated in FIG. 1, each of the axially inner sections is of smaller size than the adjacent outer section.

Fitted to the cylindrical section 15 adjacent the shoulder 16 is a ring 20 having two or more circumferentially spaced openings 21 through each of which extends a guide pin 22 that is yieldably urged by a spring 23 radially inwardly. Each pair of pins and springs is located in a bore 24 formed in the body 2, the outer end of each bore being closed by a threaded plug 25.

Accommodated in the cylindrical section 19 of the bore 13 is an annular member 26 having a cylindrical bore 27 interrupted at two or more places by circumferentially spaced cusps 28. The purpose of the cusps will be explained hereinafter.

At the free end of the body member 2 is an annular skirt 30 (FIGS. 1 and 3) having a pair of diametrally opposed slots 31, 31a therein. The slot 31 has a base 33 from which extends a flat, axial wall 34. Extending arcuately in a counterclockwise direction (as viewed in FIG. 3) from the wall 34 is a pair of radially outer and inner surfaces 35 and 36, respectively. The surface 35 is formed on a helix which extends in axial prolongation of the body 2 and has one end 37 commencing at the wall 34 and extending therefrom toward its other end 38 which terminates adjacent one side of the slot 31a. The slot 31a is similar to the slot 31 and corresponding parts are identified by the same reference characters followed by the suffix a. From the side 34a of the slot 31a extends a pair of arcuate surfaces 40 and 41 which correspond to the surfaces 35 and 36, respectively.

That wall of the notch 31 which confronts the wall 34 is formed of two radially spaced parts 45 and 46. The part 45 extends axially of the body 2 and is circumferentially offset from the part 46. The part 46 is inclined from the free end of the body 2 inwardly and toward the base 33 of the slot 31. Thus, between the parts 45 and 46 of the wall of the slot 31 is a notch 47 (FIG. 3) in which is accommodated a thin, metal wear plate 48 and a resiliently compressible pad 49 which constitutes a shock absorber. The plate 48 and the pad 49 are removably maintained in the notch 47 by a bolt 50 which passes through an opening formed in the pad 49 and is threaded into a correspondingly threaded opening in the plate 48.

The wall of the slot 31a which confronts the wall 34a is formed in the same manner as that wall of the slot 31 which confronts the wall 34. Other corresponding parts are identified by the same reference characters, followed by the suffix a. The radially inner, inclined surfaces 46, 46a hereinafter will be referred to as driving surfaces.

Adapted for removable accommodation in the bore 13 of the body 2 is a coupling member 52 comprising a shank 53 having four axially spaced portions 54, 55, 56, and 57. The section 54 has a taper complementary to that of the bore section 14, the section 55 is cylindrical and of such size as to be accommodated within the ring 20, the section 56 has a taper complementary to that of the bore section 17, and the section 57 is cylindrical and is accommodated in the member 26.

The cylindrical shank section 55 is helically threaded as at 58 and the thread is adapted to receive the free ends of the pins 22. The cylindrical end section 57 is provided with a transversely extending, threaded bore 59 for the accommodation of correspondingly threaded plugs 60 and a pair of springs 61 which urge pins 62 radially outward into engagement with the inner surface of the member 26. Suitable retainers (not shown) of conventional construction are provided at the open ends of the bore 59 to prevent expulsion of the pins 62 from the bore.

The coupling member 52 also includes a pair of diametrally opposed, radially extending lugs 64, 64a, each of which is identical. Accordingly, those parts of the lug 64a which correspond to the lug 64 are indicated by corresponding reference characters, followed by the suffix a. Each lug is of such thickness and width as to be freely accommodated in the slots 31, 31a. If a retainer sleeve is threaded onto the threaded end 3 of the body 2 the length of each lug should be such as to enable it to project beyond the periphery of the body for accommodation in slots in the retainer.

The lug 64 has a flat, axially extending surface 66 that is adapted to confront the wall 34 of the slot 31 when the lug is accommodated in such slot. The opposite side of the lug 64 has a notch 67 therein. Secured to the lug 64 by means of a screw 68 is a metal plate 69 a portion of which overlies the notch 67. Preferably, the plate 69 is formed of springy steel or the like so as to have a good degree of resiliency. That portion of the plate 69 which overlies the notch 67 preferably is engaged by the nose of a pin 70 that is slidably accommodated in a bore 71 formed in the lug 64. The pin 70 is urged toward engagement with the plate 69 by means of a spring 72 which reacts between the pin 70 and a threaded plug 73. The plate 69 constitutes a replaceable wear member for a purpose presently to be explained.

Adjacent the plate 69, but radially inwardly thereof, the face of the lug 64 is formed with an inclined surface 74 which is adapted to confront the inclined surface 46 at the one end of the arcuate surface 41. The inclination of the surface 74 is complementary to the inclination of the surface 46 and such surfaces hereinafter will be referred to as driving surfaces.

The coupling member 52 has a cylindrical boss 75 which extends in prolongation of the body 54 and both the body and the boss are provided with an axial bore 76 for the removable accommodation of the shank 77 of a rotary tool. The bore 76 and the shank 77 may be correspondingly threaded, if desired, or the bore and the shank may be complementally tapered so as to ensure retention of the tool in the coupling member, but permit removal of the tool when desired.

When it is desired to assemble the coupling member 52 equipped with a tool with the rotating body 2, the coupling member may be introduced into the bore 13 of the rotating member 2 from below, as viewed in FIG. 1. As the coupling member 52 moves into the bore, the pins 22 will seat in the helical thread 58 and assist in moving the coupling member more deeply into the bore 13.

Figure 4:
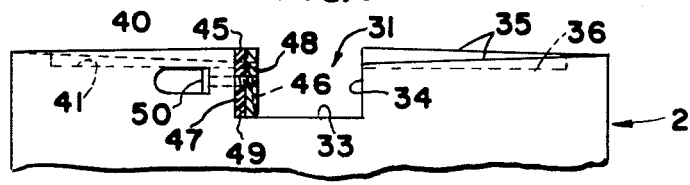
FIG. 4 is a fragmentary, sectional view taken on the line 4—4 of FIG. 3.
Figure 5:
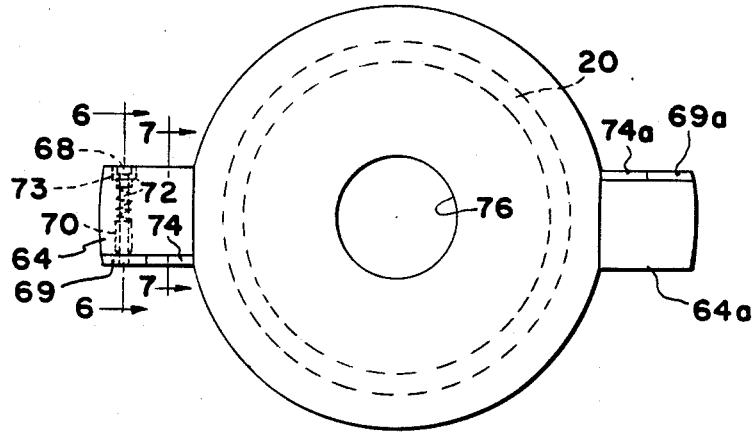
FIG. 5 is a bottom view of the coupling member removed from the tubular body.
Figure 6:
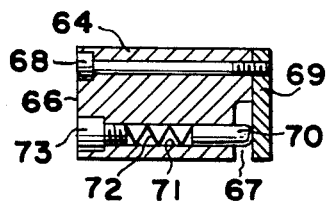
FIGS. 6 and 7 are sectional views taken on the lines 6—6 and 7—7, respectively of FIG. 5.
Figure 7:
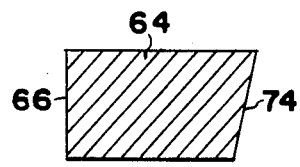
Figure 8:
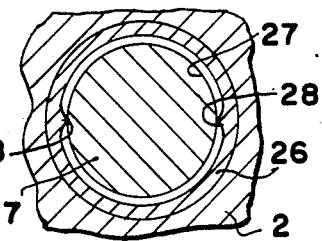
FIG. 8 is a sectional view taken on the line 8—8 of FIG. 1.

As the coupling member progresses into the bore 13, the pins 62 at the end section 57 will engage the cusps 28, thereby tending to impart rotation to the member 52. Meanwhile, the lugs 64, 64a will engage the helical surfaces 35 and 40 at the free end of the body 2. As the coupling member 52 continues to move into the bore 13 the lugs 64, 64a will traverse the helical surfaces 35 and 40 until such time as the yieldable plates 69, 69a abut the wear plates 48, 48a. Initially, the lower ends (as viewed in FIG. 6) of the plates 69, 69a will engage the upper ends (as viewed in FIG. 4) of the wear plates 48, 48a, thereby enabling the lower ends of the plates 69, 69a to be displaced against the yieldable force exerted thereon by the pins 70, 70a. In addition, the yieldable shock absorbers 45, 45a will be compressed, thereby cushioning or absorbing the shock caused by engagement of the plates 69, 69a with the plates 48, 48a.

Once the confronting surfaces of the lugs 64, 64a and the plates 48, 48a are in engagement, relative rotation between the coupling member 52 and the body 2 will cease and all parts of the assembly will rotate at the same speed. Following the initial engagement between the plates 69, 69a of the driving lugs and the wear plates 48, 48a of the body 2, the coupling member 52 will be seated fully in the bore 13, thereby effecting engagement between the inclined driving surfaces 46, 46a and 74, 74a so as to impart continuous rotation to the member 52 and the tool supported thereby. The retainer, if used, then may be rotated, as explained in the aforementioned application, to overlie the lugs 64, 64a of the coupling member and retain the latter in assembled relation with the body 2. If the retainer sleeve is not used, the body 52 may be removably retained in the body 2 by means of an extension 78 that extends through a bore 79 in the body 2 for engagement by a power draw bar (not shown) of conventional construction.

Insertion of the coupling member 52 in the bore 13 will enable the tapered sections 54 and 56 of the coupling member to seat on the correspondingly tapered sections 14 and 17 of the bore 13. In addition, the cylindrical section 55 will seat on the ring 20. As a consequence, the coupling member 52 has exceedingly good lateral stability.

To effect removal of the coupling member 52 from the bore 13, the retainer sleeve or the power draw bar may be adjusted to enable the member 52 to be withdrawn from the bore 13 in the same manner disclosed in the aforementioned patents and applications.

After prolonged useage the plates 48, 48a and 69, 69a may become worn or deformed. If so, they may be replaced with others, thereby avoiding the greater expense of replacing or rebuilding the members 2 or 52.

The inclination of the driving surfaces 46, 46a and 74, 74a avoids engagement therebetween until after the plates 48, 48a and 69, 69a have engaged one another and the members 2 and 52 are rotating at the same or substantially the same speed. As a consequence, the driving surfaces are protected against wear and deformation.

The disclosed embodiment is representative of a presently preferred form of the invention, but is intended to be illustrative rather than definitive thereof. The invention is defined in the claims.

I claim:

1. In tool holder apparatus having a body member rotatable about an axis, said body member having an axially extending socket at one end encircled by an annular wall having at said one end of said socket a helical surface interrupted by at least one radial slot defined by a pair of circumferentially spaced sides, a tool-supporting member having at least one lug projecting radially therefrom a distance to bear upon said surface and of such circumferential width as to be seated in said slot with one side of said lug confronting one side of said slot, the seating of said lug in said slot occurring in response to relative rotation and relative axial movement of said members, the improvement comprising circumferentially yieldable shock absorber means; and means mounting said shock absorber means on one of said members in a position to be engaged by said one side of the other of said members for cushioning shocks between said confronting sides resulting from relative rotation of said members.

2. Apparatus according to claim 1 wherein said shock absorber means is carried by said lug.

3. Apparatus according to claim 1 wherein said shock absorber means is carried by said body.

4. Apparatus according to claim 1 wherein each of said lug and said body carries a yieldably displaceable plate constituting said shock absorber means.

5. Apparatus according to claim 1 wherein said shock absorber means is in engagement with a yieldable member.

6. Apparatus according to claim 1 wherein said shock absorber means is carried by said lug and comprises a springy member having a gap between itself and said lug.

7. Apparatus according to claim 6 wherein said shock absorber means is separate from said lug, and including means securing said shock absorber means to said lug.

8. Apparatus according to claim 1 including means on said coupling member and on said lug defining engageable and disengageable driving surfaces.

9. Apparatus according to claim 8 wherein said driving surfaces are radially displaced from said shock absorber means.

10. Apparatus according to claim 9 wherein said driving surfaces are radially inboard of said shock absorber means.

11. Apparatus according to claim 1 including resilient means bearing on said shock absorber means and yieldably opposing displacement thereof.

12. Apparatus according to claim 1 wherein said coupling member has a plurality of axially spaced tapered sections thereon and said tubular member has a socket provided with a corresponding plurality of complementally tapered sections spaced according to the spacing of the tapered sections on said coupling member.

13. Apparatus according to claim 12 wherein adjacent tapered sections of said coupling member and said socket are spaced by a generally cylindrical section.

14. Apparatus according to claim 13 wherein the generally cylindrical section of said socket accommodates a sleeve.

15. Apparatus according to claim 14 wherein the generally cylindrical section of said socket which confronts said sleeve is helically threaded.

16. Apparatus according to claim 15 including guide pins carried by said body for engagement with the threaded section of said coupling member.

17. Apparatus according to claim 16 including means yieldably urging said guide pins radially inwardly of said body.

18. Apparatus according to claim 1 including a recess in said body, an annular member fixed in said recess, and an axially projecting extension on said coupling member for removable accommodation in said recess, said extension and said recess having cooperable means for limiting relative rotation between said body and said coupling member.

19. In tool holder apparatus adapted for removable connection to a body member rotatable about an axis, said body member having an axially extending socket provided with an annulus having at least one radially extending slot therein defined by a pair of circumferentially spaced sides, and a tool-supporting coupling member removably accommodated in said socket, said coupling member having a radially extending lug accommodated in said slot with one side of said lug confronting one of said sides of said slot, the improvement comprising circumferentially yieldable shock absorber means carried by at least one of said members and interposed solely between said confronting sides.

20. Apparatus according to claim 19 wherein said socket has a plurality of axially spaced, tapered sections and said coupling member has a corresponding plurality of correspondingly spaced, complementary tapered sections seated on the tapered sections of said socket.

21. Apparatus according to claim 19 wherein said shock absorber means is carried by said body member.

22. Apparatus according to claim 19 wherein said shock absorber means is carried by said coupling member.

23. Apparatus according to claim 19 wherein each of said members carries said shock absorber means.

24. Apparatus according to claim 19 wherein said shock absorber means comprises a pad formed of resiliently compressible material.

25. Apparatus according to claim 24 including a wear plate overlying said pad.

26. Apparatus according to claim 19 wherein one of said confronting sides has a notch therein and wherein said shock absorber means comprises a springy metallic member overlying said notch.

27. Apparatus according to claim 20 wherein adjacent tapered sections of said socket are spaced by a cylindrical section.

28. Apparatus according to claim 27 wherein adjacent tapered sections of said coupling member are spaced by a cylindrical section.

29. Apparatus according to claim 28 including a cylindrical ring interposed between the cylindrical sections of said socket and said coupling member.

30. Apparatus according to claim 29 wherein said cylindrical section of said coupling member has a helical thread and said body member includes means extending through said ring and accommodated in said thread.

31. Apparatus according to claim 19 including cooperable means carried by said body member and said coupling member operable as the latter is introduced into said socket to effect movement of said coupling member in a direction into said socket.

32. Apparatus according to claim 19 including cooperable means carried by said body member and said coupling member and operable as the latter is introduced into said socket to impart rotation to said coupling member.

* * * * *